April 9, 1968 C. A. WENDELL 3,377,590

RADAR RANGING APPARATUS FOR A COMMUNICATION SYSTEM

Filed Nov. 29, 1966 4 Sheets-Sheet 1

INVENTOR
CHESTER A. WENDELL
BY [signature]
AGENT

INVENTOR
CHESTER A. WENDELL
BY [signature]
AGENT

INVENTOR
CHESTER A. WENDELL
BY [signature]
AGENT

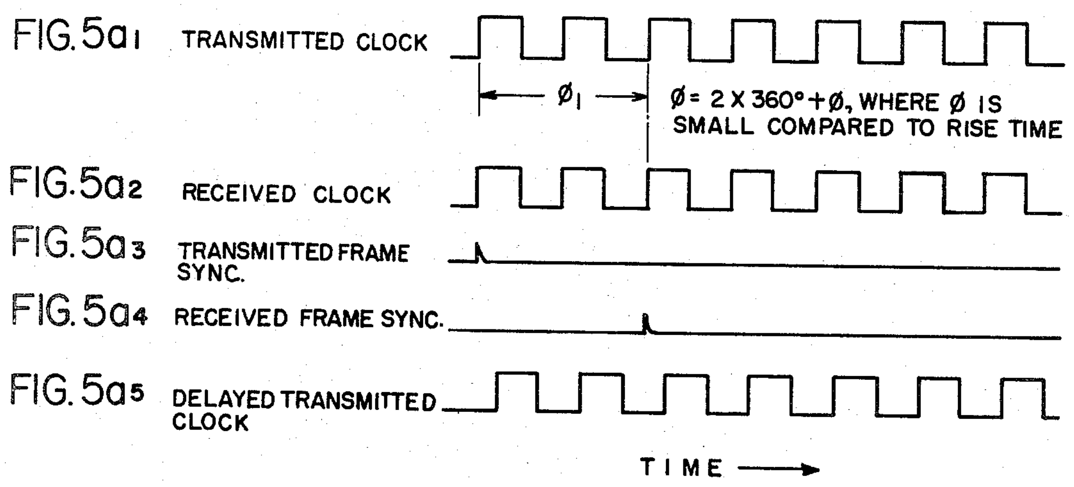
FIG. 5a1, FIG. 5a2, FIG. 5a3, FIG. 5a4, FIG. 5a5
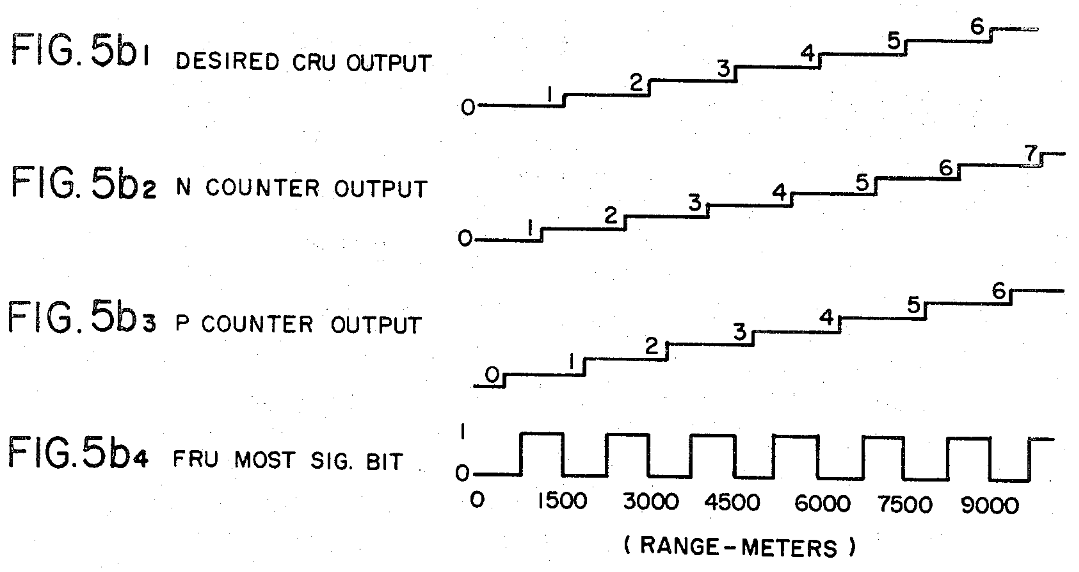
FIG. 5b1, FIG. 5b2, FIG. 5b3, FIG. 5b4
INVENTOR
CHESTER A. WENDELL
BY [signature]
AGENT

United States Patent Office 3,377,590

Patented Apr. 9, 1968

3,377,590

RADAR RANGING APPARATUS FOR A COMMUNICATION SYSTEM

Chester A. Wendell, Framingham, Mass., assignor to Raytheon Company, Lexington, Mass., a corporation of Delaware Filed Nov. 29, 1966, Ser. No. 597,658

5 Claims. (Cl. 343—12)

ABSTRACT OF THE DISCLOSURE

Apparatus for a two-way data communication system which produces an indication of the range between the two communicating stations, the apparatus including one unit which determines fine range by comparing the transmitted communication clock signal with the returned clock signal, and another unit which determines coarse range by measuring the time lapse between the transmission and reception of a communication synchronization signal.

*Background of the invention*

This invention is concerned with systems for both communicating between two stations and determining the range from one station to the other.

In the prior art, two separate systems are utilized, each for accomplishing one of these functions. Thus, a communication system and radar or equivalent range measuring system are used. Hence, the equipment required is heavy, large in size and undesirably bulky.

*Summary of the invention*

A two-way data communication system includes apparatus for determining the range between two stations by operating on the clock and synchronizing signals which are normally generated for data communication purposes. A fine range unit divides the transmitted clock signal by four in a divider before applying the result to a fine range counter which is then set to a value of 192. Counting pulses from a multiplier step the fine range counter to a maximum, cause it to recycle to zero and start counting again. The divider output is also multiplied by three in a multiplier and transferred to a mixer. When it is received, the received clock signal is mixed with the multiplier output and the result causes the value in the counter or fine range to be read out. A coarse range unit includes an N counter and a P counter which are reset by the transmitted synchronizing signal. A 90° delay circuit delays the transmitted clock signal before applying it to the N and P counters. The N counter counts the negative-going transitions of the delayed signal, while the P counter counts the positive-going transitions. The received synchronizing signal reads out the counter data into an N register and a P register. The most significant fine range bit determines whether the content of the N register or the P register provides the coarse range information. When this bit is a ONE, the P register is read out; and, when this bit is a ZERO, the N register is read out. The ranging information is stored in an output register and comprises fine and coarse range data.

*Brief description of the drawings*

FIGS. 5*a*1–5 and 5*b*1–4 show various signals in the communication system; and, FIG. 6 is a block diagram of the coarse range unit.

*Description of the preferred embodiment*

Figure 1:
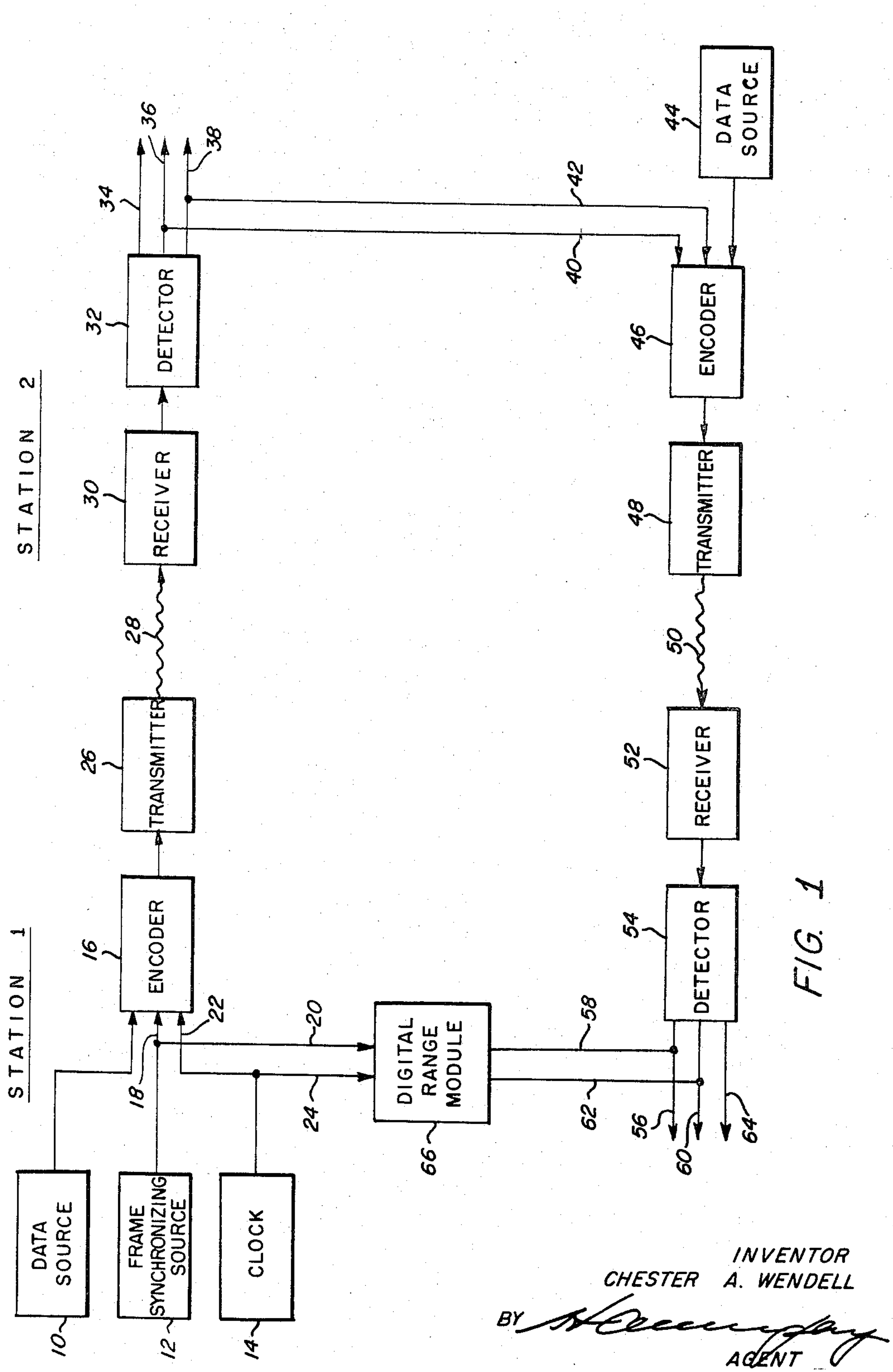
FIG. 1 is a block diagram of a data communication system including a digital range module.

In order to provide two-way radio communication and radar ranging between two stations, a digital range module 66 is added to a well-known, time division multiplex telemetry and communication system as shown in FIG. 1. The combined use of transmitter, receiver, and detection equipment does not degrade either data transmission or ranging, and greatly reduces the size and weight of equipment required to perform these separate data and ranging functions. Station 1 is the ranging station, and station 2 the station to which range is measured. Digital range module 66 determines the range of station 2 by measuring the delay of a data signal in going from station 1 to station 2 and returning again to station 1. Thus, the communication system of FIG. 1 also operates as a radar, making use of the transitions in the data signal as a ranging reference or if used with transmission lines to measure variations in transmission line delay.

Data source 10 applies the data signals to be transmitted to encoder 16. Frame synchronizing source 12 transmits frame synchronizing signals to input 18 of encoder 16 and input 20 of digital range module 66, while clock 14 transmits clock signals to input 22 of encoder 16 and input 24 of digital range module 66. Encoder 16 codes the data signals with the frame synchronizing signals and the clock signals. The coded data word is then passed to transmitter 26 which propagates it via radio link 28 to receiver 30. Receiver 30 next transfers the coded data to detector 32 where the data signals, frame synchronizing signals, and clock signals are extracted. Any well-known detector may be used for doing this. For example, the combination of a one-half bit rate filter connected to a decision circuit for generating the data signals; a frame detector pattern recognizer for generating the frame synchronizing signals; and, a summing circuit, filter and voltage controlled oscillator for generating the clock signals when used with pulse code modulated data transmission. Additional communication apparatus (not shown) receives the data signals on line 34, the frame synchronizing signals on line 36 and the clock signals on line 38 and processes the information contained in these signals. Detector 32 also passes the frame synchronizing signals via line 40 and the clock signals via line 42 to encoder 46. Data signals are applied to encoder 46 by data source 42 where they are coded using the frame synchronizing and clock signals generated by detector 32. The coded data signals are then applied to transmitter 48 which transmits them via radio link 50 to receiver 52. Receiver 52 next applies the coded data word signals to detector 54 which produces data signals on output line 64, frame synchronizing signals on line 56, and clock signals on line 60 for processing by communication apparatus (not shown). The frame synchronizing signals and the clock signals are also applied by detector 54 to digital range module 66 via lines 58 and 62 respectively.

Accordingly, a closed loop is established in the communication data system with a total delay of the encoded data proportional to equipment delay plus twice the range to station 2. The purpose of digital range module 66 is to extract the range to station 2 from this total delay.

In order to describe the operation of digital range module 66, it is necessary to provide a few details of the overall data link.

The transmitted clock signal can be represented as:

$$\sin wt$$

where $w=2\pi f$ and $f$=clock frequency.

This clock signal is not normally transmitted separately, but is used to encode the data signal and is extracted from the data signal at data detection. After the round trip, the return clock signal can be represented as:

$$\sin(wt+\phi_1)$$

where $\phi_1$ is the phase shift caused by the round trip delay plus equipment delays. The equipment delays are controlled by design and hence constitute known quantities. In the usual case, phase shift $\phi_1$ is much greater than 360 degrees. For example, one cycle or 360° of a 100 kilocycle clock represents 1,500 meters of range or quite a bit less than a mile. Thus, a more realistic representation of the return clock signal is:

$$\sin(wt+n360°+\phi)$$

where $(n360°+\phi)=\phi_1$ and $n$ is zero or a positive integer and $\phi$ is the fraction of a full cycle remaining.

Accordingly, the ranging problem can be broken into two parts: (1) coarse range or the determination of $n$, and (2) fine range or the determination of $\phi$. Digital range module 66 determines fine range or $\phi$ by comparing the transmitted clock signal received on line 24 with the returned clock signal received on line 62. In addition, digital range module 66 obtains coarse range by measuring the time lapse between the transmission and reception of a known synchronization signal. Hence, the time between the receipt of a signal on lines 20 and 58 is measured.

Figure 2:
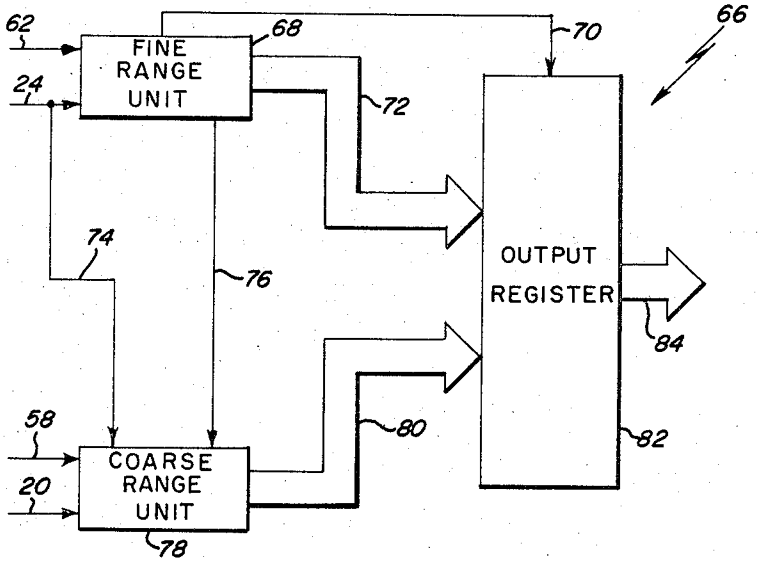
FIG. 2 is a block diagram of a digital range module.

Digital range module 66 is shown in FIG. 2 and comprises fine range unit 68, coarse range unit 78, and output register 82. The transmitted clock signal appearing on line 24 is compared with the received clock signal appearing on line 62 in fine range unit 68 which then transmits the result of this comparison to the least significant bit positions of output register 82 via lines 72. Coarse range unit 78 may comprise a counter, for example, which measures the time delay between the receipt of a transmitted frame synchronizing signal received on line 20 and a received frame synchronizing signal received on line 58. The output of coarse range unit 78 is read into the most significant bit positions of output register 82 via lines 80. Coarse range unit 78 and fine range unit 68 are arranged so that the fine range bits recycle to zero each time coarse range is updated by one count; therefore, output register 82 stores a binary number representing total unambiguous range.

In order to better describe this invention, a hypothetical system with realistic frequencies will be described in order to make the discussion more concrete. However, it should be appreciated that this does not imply any upper or lower operation limit but represents a typical application.

Type Telemeter: pulse code modulation using non-return-to-zero at the output and no separate transmitted clock Bit Rate: 200 kilocycles Extracted Clock Frequency:

$$\frac{\text{Bit Rate}}{2}=100 \text{ kilocycles}$$

Frame Sync. Rate:

$$\frac{200{,}000}{8{,}192}=\begin{array}{l}\text{24.4 per second for an unambiguous range of}\\ \text{approximately 3,360 nautical miles}\end{array}$$

Fine Range Least Count: less than 6 meters

Bit Error Probability in Data: less than $10^{-3}$

Figures 3A, 3B, 3C, 3D, 3E, 3F, 3G, 3H:
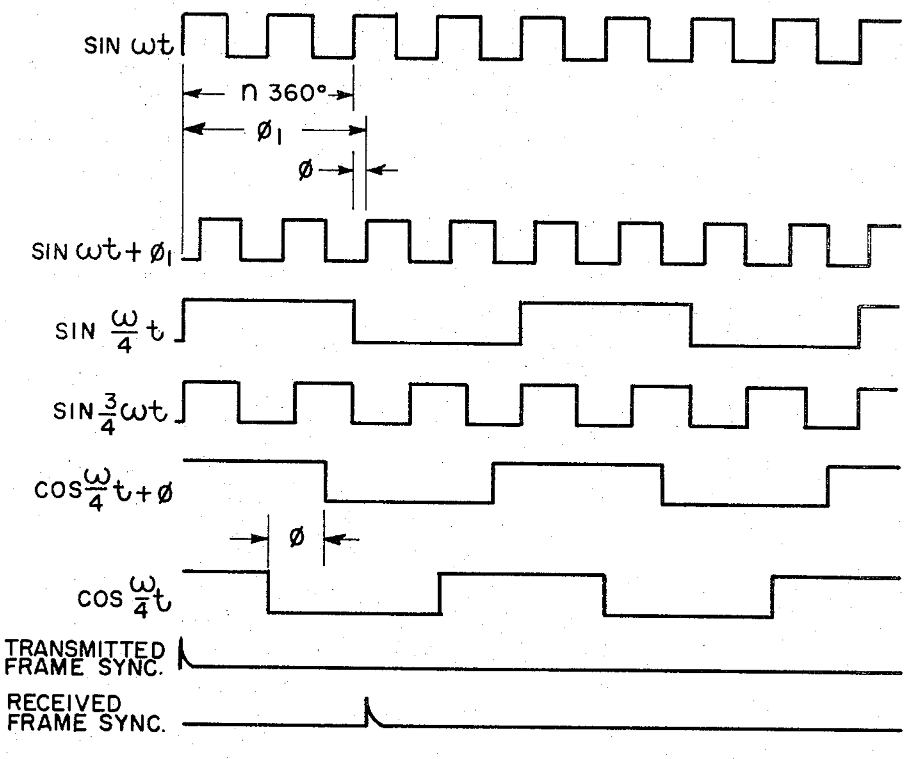
FIGS. 3*a–h* depict various waveforms in the communication system.

FIGS. 3*a*–3*h* depict signals at various places in the telemetry and communication system of FIG. 1. FIG. 3*a* shows the outgoing clock signal, while FIG. 3*b* shows the range delayed clock signal with $\phi_1$ representing total two-way range and $\phi$ the measurement of fine range. Square waves are used to represent sine waves in order to better visualize the signal transitions.

Figure 4:
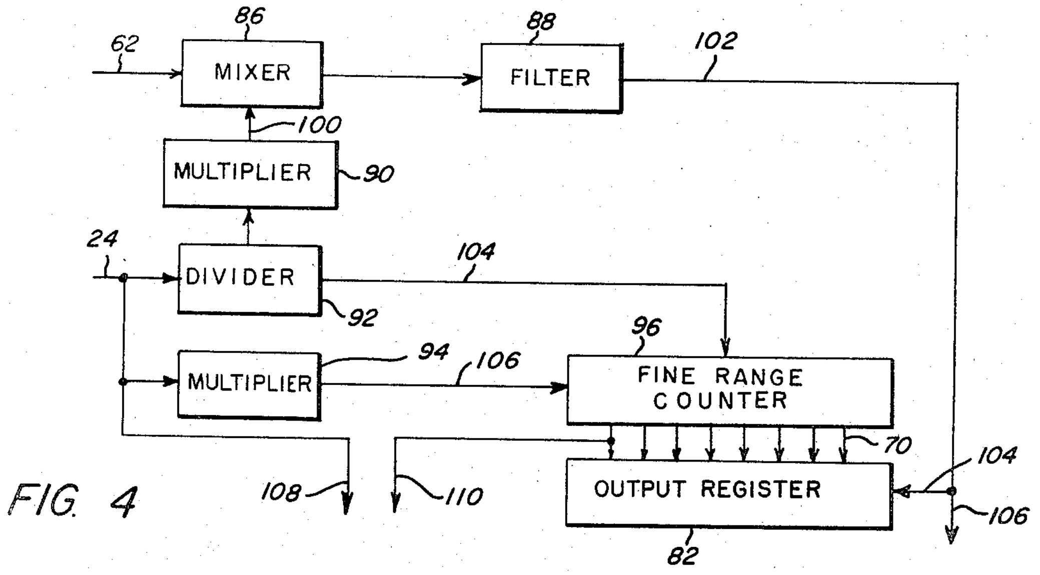
FIG. 4 is a block diagram of the fine range unit.

Fine Range Unit 68 shown in FIG. 4 uses simple digital counters rather than analog phase comparison circuits to measure the delay between transmitted and received clock signals. Before discussing the implementation of fine range unit 68 as shown in FIG. 4, other possible implementations thereof will now be discussed. A first unit for determining fine range utilizes a simple gate and clock (not shown). The positive going transition of the transmitted clock signal opens the gate and allows short count pulses to pass to the counter. The next positive going transition of the return clock signal closes the gate, thus leaving a measure of $\phi$ in binary form in the counter. The necessary counter frequency is determined by the fine range least count of 6 meters, which is the minimum range step or quanta of range which can be discerned. This should not be confused with accuracy which is determined by signal-to-noise ratio and bandwidth. Six meters of one-way range is equivalent to 0.040$\mu$ sec. or a counter rate of $$\frac{1}{0.40\times10^{-6}}=25 \text{ mc.}$$

which is beyond the state-of-the art for reliable counting by many present day counters.

A second unit for determining fine range utilizes a phase or frequency divider for dividing the clock signal in frequency while retaining the phase relation at the new frequency. Dividing the return clock signal by four would yield:

$$\sin(\tfrac{1}{4}wt+\phi/4)$$

Hence, a lower frequency is produced, but $\phi$ has also been proportionately reduced. The time measurement is still 0.040$\mu$ sec. per six meters of range, and the 25 mc. counter is still required.

Fine range unit 68 of this invention is shown in FIG. 4 and comprises mixer 86 connected to filter 88 and times three multiplier 90, divide by four divider 92 connected to multiplier 90, times sixty-four multiplier 94, fine range counter 96 connected to divider 92 and multiplier 94, and output register 82 connected to fine range counter 96. The transmitted clock signal, sin $wt$, is applied to coarse range unit 78 via line 108, to multiplier 94 which then produces counting signals, and to input line 24 of divider 92 by clock 14 where it is divided by four. The reference signal, sin $w/4t$, which is shown in FIG. 3*c* is then applied to multiplier 90 and fine range counter 96 by divider 92 for resetting fine range counter 96. Multiplier 90 multiplies this reference signal by three and applies the reference signal shown in FIG. 3*d*, sin ¾ $wt$, to input line 100 of mixer 86. Detector 54 applies the received clock signal to input line 62 of mixer 86 where the received clock signal is multiplied by the reference signal generated by multiplier 90 to produce the following:

$$[\sin(wt+\phi_1)][\sin \tfrac{3}{4}wt]=\tfrac{1}{2}\cos[(w-\tfrac{3}{4}w)t+\phi_1]-\tfrac{1}{2}\cos[(w+\tfrac{3}{4}w)t+\phi_1]$$

Since $\phi_1$ cannot be recognized in fine range detection, it is valid to substitute $\phi$ for $\phi_1$. Low pass filter 88 filters the output of mixer 86 with a gain of two in order to remove the one-half amplitude term and generates the following signal which is depicted in FIG. 3*e*:

$$\cos(\tfrac{1}{4}wt+\phi)$$

This is applied to input 104 of output register 82 and to coarse range unit 78. Accordingly, true frequency division is accomplished with phase unchanged.

The desired fine range $\phi$ is proportional to the time between the negative-going transitions of FIGS. 3*e* and 3*f*. However, the reference signal, sin $w/4t$ and not cos $w/4t$ is generated in fine range unit 68 by divider 92. Since cos $w/4t$ is used to determine fine range $\phi$, it is necessary to accommodate for the difference between sin $w/4t$ and cos $w/4t$. Consequently, the positive-going reference transition of sin $w/4t$ appearing on line 104 sets fine range counter 96 to a count of 192. The counting pulses which are applied to line 106 by multiplier 94 then step fine range counter 96 to a maximum count of 256 and cause it to cycle to zero. Hence, the count in fine range counter 96 is at zero at the time corresponding to the negative-going transition of FIG. 3*f*. The counting pulses on line 106 continue to increase the count of fine range counter 96 until the negative-going transition of FIG. 3*e*, cos $(w/4t+\phi)$ received on line 104 causes the data content of fine range counter 96 which now is a measurement of fine range to be read into output register 82 via lines 70. At the same time, the most significant fine range bit is applied to coarse range unit 78 via line 110.

Figure 6:
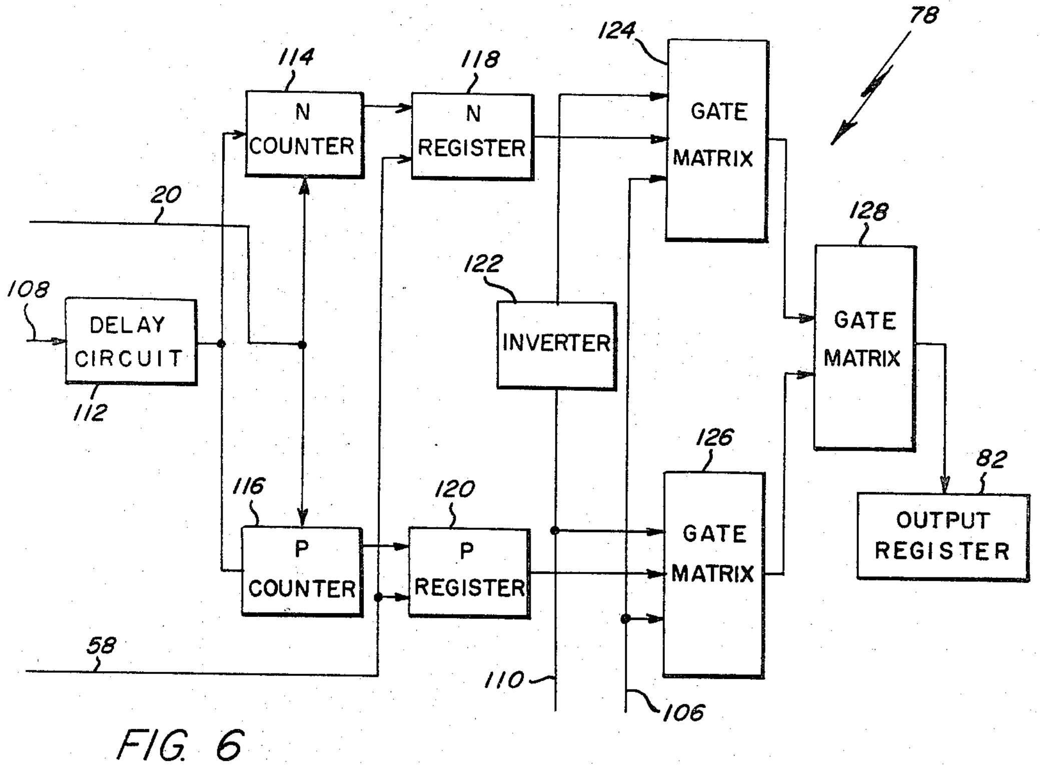

Coarse range unit 78 is shown in FIG. 6 and comprises 90° delay circuit 112 connected to N counter 114 and P counter 116, N register 118 connected to N counter 114 and gate matrix 124, P register 120 connected to P counter 116 and gate matrix 126, inverter 122 connected to gate matrices 124 and 126, and gate matrix 128 connected to gate matrices 124 and 126. In the example given in FIG. 3*a*, *n* or coarse range is equal to two, and a simple counter could be used to count the positive-going transitions of the transmitted clock signal between the transmitted and received frame synchronizing signals. However, using such a simple counter, there is a point in each cycle where an ambiguity occurs due to the finite rise time of the counter logic circuits. This is illustrated in FIGS. 5*a*1–*a*4 and occurs whenever the range is approximately an integral number of complete clock cycles. In this situation, there is always a question of whether the coarse range counter has over or under counted by one.

Coarse range unit 78 shown in FIG. 6 automatically corrects for this error. The transmitted clock signal is applied to input line 108 of delay circuit 112 where it is delayed by an amount equivalent to equipment delays plus 90°. The transmitted frame synchronizing signal of FIG. 3*g* received on line 20 resets N counter 114 and P counter 116 to zero. The delayed transmitted clock signal shown in FIG. 5*a*5 is applied to both N counter 114 and P counter 116. N counter 114 counts the negative-going transitions of this signal, while P counter 116 counts the positive-going transitions. When the received synchronizing signal of FIG. 3*h* is received on line 58, the data count of N counter 114 is read into N register 118, and the data count of P counter 116 is read into P register 120.

FIG. 5*b*1 shows the desired output of coarse range unit 78, while FIGS. 5*b*2 and 5*b*3 show the outputs of N counter 114 and P counter 116, respectively. The changes of state of the most significant bit produced by fine range counter 96 is depicted in FIG. 5*b*4. Selection of the output of either N register 118 or P register 120 for representing coarse range is based entirely on the very precise range output of fine range unit 68, and thus the rise time of counters 114 and 116 and the frame synchronizing signals are non-critical. When the most significant bit signal shown in FIG. 5*b*4 is in the zero state, the data content of N storage register 118 is read; however, when the most significant bit signal is in the one state, the data content of P storage register 120 is read. This causes the steps in FIG. 5*b*1 showing the desired coarse range unit output to be completely determined by the change of state in FIG. 5*b*4 from one to zero.

Gate matrices 124 and 126 each comprise twelve AND gates, while gate matrix 128 comprises twelve OR gates. The data stored in N register 118 is applied to gate matrix 124, whereas the data stored in P register 120 is applied to gate matrix 126. If the most significant bit signal appearing on line 110 is a ONE, then a ONE is applied to gate matrix 126; however, if that bit signal is a ZERO, it is inverted by inverter 122 and a ONE is applied to gate matrix 124. The negative-going transition of FIG. 3*e*, cos $(w/4t+\phi)$, is applied to both gate matrix 124 and gate matrix 126 via line 106. At this time, gate matrix 124 generates the data content of N register 118 if inverter 122 produces a ONE; and, gate matrix 126 generates the data content of P register 120 if the signal on line 10 is a ONE. Gate matrix 128 passes the data from either gate matrix 124 or 126 to the twelve most significant bit positions of output register 82, representing coarse range.

Coarse range unit 78 has other advantages over the simple counter of positive-going transitions. For exampMle, with a simple counter there is no way to update its data content with increasing or decreasing range until the next frame synchronizing signal. However, coarse range unit 78 corrects ambiguities for changes in range.

The invention is not limited to the specifics of the preceding description of a preferred embodiment but embraces the full scope of the following claims.

I claim:

1. For a data communication system having first and second stations, said first station transmitting clock and synchronizing signals to said second station and receiving clock and synchronizing signals from said second station, apparatus for determining the range of said second station, comprising:

fine range means for determining the time lapse between transmitting and receiving said clock signals and generating binary bits describing fine range, including a counter, first multiplier means coupled to said counter for generating counting signals, divider means for dividing the transmitted clock signal to generate an output signal causing said counter to begin counting, second multiplier means for multiplying said divider output signal and generating an output signal, and mixer means for mixing the received clock signal with the second multiplier output signal and causing said counter to stop counting; and, coarse range means for determining the time lapse between transmitting and receiving said synchronizing signals and generating binary bits describing coarse range, including means for delaying the transmitted clock signal and generating an output signal having positive and negative-going transitions, first counter means coupled to said delaying means for counting said positive-going transitions and storing a data count, second counter means coupled to said delaying means for counting said negative-going transitions and storing a data count, said first and second counter means being reset by said transmitted synchronizing signal and stopping counting in response to said received synchronizing signal, and means responsive to one of said fine range bits for selecting the data count of one of said counter means.

2. In combination with a data communication system having first and second stations, the first station transmitting clock and synchronizing signals to the second station and receiving clock and synchronizing signals from the second station;

an apparatus for determining the range between the first and second stations comprising:

means for resolving range as a fraction of a clock signal interval responsive to the time difference between a transmitted and received clock signal; and ranging means responsive to the time difference between a transmitted and received synchronizing signal.

3. In combination with a data communication system having first and second stations, the first station transmitting clock and synchronizing signals to the second station and receiving clock and synchronizing signals from the second station;

an apparatus for determining the range between the first and second stations comprising:

means for providing digital signal representation of range resolution as a fraction of a clock signal interval responsive to the time difference between a transmitted and received clock signal; and means for providing digital signal representation of range proportional to the time difference between a transmitted and received synchronizing signal, the least significant digit of the ranging signal being determined by the most significant digit of the range resolution signal.

4. An apparatus according to claim 3, characterized in that:

the range resolution means comprises:

a counter; and a gating arrangement responsive to the transmitted clock signal initiating the counter and further responsive to the received clock signal for terminating the counting.

5. An apparatus according to claim 3, characterized in that the ranging means comprises:

a delay element for delaying the transmission of the clock signal;

a first counter coupling the delay element for counting the positive going clock signal transitions; and a second counter coupling the delay element for counting the negative going clock signal transitions.

References Cited

UNITED STATES PATENTS

| | | | |
|---|---|---|---|
| 3,155,972 | 11/1964 | Boyer | 343—12 |
| 3,199,104 | 8/1965 | Miller | 343—12 |
| 3,300,780 | 1/1967 | Mason | 343—12 |

RODNEY D. BENNETT, *Primary Examiner.*

RICHARD A. FARLEY, *Examiner.*

J. P. MORRIS, *Assistant Examiner.*

UNITED STATES PATENT OFFICE

CERTIFICATE OF CORRECTION

Patent No. 3,377,590 April 9, 1968

Chester A. Wendell

It is certified that error appears in the above identified patent and that said Letters Patent are hereby corrected as shown below:

Column 4, line 19, the formula should appear as shown below:

$$\frac{1}{0.040 \times 10^{-6}} = 25 \text{ MC}$$

Signed and sealed this 10th day of March, 1970.

(SEAL)
Attest:

Edward M. Fletcher, Jr.
Attesting Officer

WILLIAM E. SCHUYLER, JR.
Commissioner of Patents